(12) United States Patent
Ryser et al.

(10) Patent No.: US 9,392,901 B2
(45) Date of Patent: *Jul. 19, 2016

(54) CAP EXTRACTION DEVICE

(71) Applicant: NESTEC S.A., Vevey (CH)

(72) Inventors: Antoine Ryser, Lausanne (CH);
Christophe Boussemart, Lugrin (FR);
Jean-Luc Denisart, Cully (CH);
Antoine Cahen, Lausanne (CH)

(73) Assignee: Nestec S.A., Vevey (CH)

( * ) Notice: Subject to any disclaimer, the term of this patent is extended or adjusted under 35 U.S.C. 154(b) by 292 days.

This patent is subject to a terminal disclaimer.

(21) Appl. No.: 14/080,268

(22) Filed: Nov. 14, 2013

(65) Prior Publication Data

US 2014/0069281 A1  Mar. 13, 2014

Related U.S. Application Data

(63) Continuation of application No. 12/607,670, filed on Dec. 8, 2009, now Pat. No. 8,613,246, which is a continuation of application No. 10/563,611, filed as application No. PCT/EP2004/006672 on Jun. 21, 2004, now Pat. No. 7,703,380.

(30) Foreign Application Priority Data

Jul. 10, 2003 (EP) ..................................... 03015776

(51) Int. Cl.
*A47J 31/40* (2006.01)
*A47J 31/36* (2006.01)

(52) U.S. Cl.
CPC ............ *A47J 31/407* (2013.01); *A47J 31/3633* (2013.01); *A47J 31/3638* (2013.01); *A47J 31/3676* (2013.01); *A47J 31/368* (2013.01)

(58) Field of Classification Search
CPC . A47J 31/3614; A47J 31/3676; A47J 31/368; A47J 31/369; A47J 31/38; A47J 31/3633
USPC .............................. 99/289 R, 295, 302 P, 297
See application file for complete search history.

(56) References Cited

U.S. PATENT DOCUMENTS

| | | |
|---|---|---|
| 2,514,360 A | 3/1946 | Alvarez |
| 2,715,868 A | 8/1955 | Brown |
| 3,260,190 A | 7/1966 | Levinson |
| 3,320,572 A | 5/1967 | Schwartz |
| 3,374,979 A | 3/1968 | Coldren et al. |
| 3,919,520 A | 11/1975 | Pickard |

(Continued)

FOREIGN PATENT DOCUMENTS

| | | |
|---|---|---|
| CA | 503630 | 6/1954 |
| CA | 2683562 | 10/2008 |

(Continued)

*Primary Examiner* — Reginald L Alexander
(74) *Attorney, Agent, or Firm* — K&L Gates LLP

(57) ABSTRACT

The invention relates to a device for extracting a cap comprising a first part, a second part which is movable with respect to the second part which is provided with a space for the cap and defines the cap extracting position in a closed position thereof, an introduction and positioning part comprising the cap guiding elements which are arranged in such a way that it is possible to insert it in an intermediate position and a beverage pouring system in which the second movable part displaces the cap from the intermediate position to the extraction position.

14 Claims, 12 Drawing Sheets

(56) References Cited

U.S. PATENT DOCUMENTS

| | | |
|---|---|---|
| 4,242,568 A | 12/1980 | Wunderlin et al. |
| 4,551,611 A | 11/1985 | Longo |
| 4,589,374 A | 5/1986 | Farina |
| 4,595,131 A | 6/1986 | Ruskin et al. |
| 4,760,744 A | 8/1988 | Simonsen et al. |
| 4,871,089 A | 10/1989 | Rader et al. |
| 4,949,627 A | 8/1990 | Nordskog |
| 5,019,690 A | 5/1991 | Knepler |
| 5,257,341 A | 10/1993 | Austin, Jr. et al. |
| 5,392,694 A | 2/1995 | Muller et al. |
| 5,402,707 A | 4/1995 | Fond et al. |
| 5,531,152 A | 7/1996 | Gardosi |
| 5,649,472 A | 7/1997 | Fond et al. |
| 5,755,149 A | 5/1998 | Blanc et al. |
| 5,776,527 A | 7/1998 | Blanc |
| 5,794,519 A | 8/1998 | Fischer |
| 5,836,236 A | 11/1998 | Rolfes et al. |
| 5,897,899 A | 4/1999 | Fond |
| 5,943,472 A | 8/1999 | Charles et al. |
| 5,992,298 A | 11/1999 | Illy et al. |
| 6,009,792 A | 1/2000 | Kraan |
| 6,025,000 A | 2/2000 | Fond et al. |
| 6,026,732 A | 2/2000 | Kollep et al. |
| 6,035,762 A | 3/2000 | Ruckstuhl |
| 6,062,732 A | 5/2000 | Scott |
| 6,393,967 B2 | 5/2002 | Fischer |
| 6,453,800 B1 | 9/2002 | Chen |
| 6,490,966 B2 | 12/2002 | Mariller et al. |
| 6,554,588 B1 | 4/2003 | DiBenedetto |
| 6,698,332 B2 | 3/2004 | Kollep et al. |
| 6,748,850 B1 | 6/2004 | Kraan |
| 6,857,353 B2 | 2/2005 | Kollep et al. |
| 6,889,598 B2 | 5/2005 | Wroblewski |
| 6,994,015 B2 | 2/2006 | Bruinsma |
| 6,996,251 B2 | 2/2006 | Malone et al. |
| 7,077,053 B2 | 7/2006 | Kraan |
| 7,131,369 B2 | 11/2006 | Gantt et al. |
| 7,165,488 B2 | 1/2007 | Bragg et al. |
| 7,231,869 B2 | 6/2007 | Halliday et al. |
| 7,286,752 B2 | 10/2007 | Gourand |
| 7,287,461 B2 | 10/2007 | Halliday et al. |
| 7,316,178 B2 | 1/2008 | Halliday et al. |
| 7,383,763 B2 | 6/2008 | Dijs |
| 7,418,899 B2 | 9/2008 | Halliday et al. |
| 7,562,618 B2 | 7/2009 | Jarisch et al. |
| 2002/0148357 A1 | 10/2002 | Lazaris et al. |
| 2003/0019367 A1 | 1/2003 | Fogagnolo et al. |
| 2003/0047080 A1 | 3/2003 | Wu |
| 2003/0066431 A1 | 4/2003 | Fanzutti et al. |
| 2004/0031394 A1 | 2/2004 | Yoakim et al. |
| 2004/0101293 A1 | 5/2004 | Bissonnette et al. |
| 2005/0106288 A1 | 5/2005 | Blanc et al. |
| 2005/0235834 A1 | 10/2005 | Blanc et al. |
| 2006/0102008 A1 | 5/2006 | Lin |
| 2007/0012685 A1 | 1/2007 | Gourand |
| 2007/0044664 A1 | 3/2007 | Wang |
| 2007/0104837 A1 | 5/2007 | Yoakim et al. |
| 2008/0006159 A1 | 1/2008 | Fischer |
| 2008/0028947 A1 | 2/2008 | Magg et al. |
| 2008/0203870 A1 | 8/2008 | Riley et al. |
| 2008/0236403 A1 | 10/2008 | Cortese |
| 2008/0273868 A1 | 11/2008 | Boussemart et al. |
| 2009/0154909 A1 | 6/2009 | Meyer |
| 2009/0205503 A1 | 8/2009 | Cortese |
| 2009/0249961 A1 | 10/2009 | Cheng |
| 2009/0308259 A1 | 12/2009 | Hiron |
| 2010/0011965 A1 | 1/2010 | Turi |
| 2010/0101428 A1 | 4/2010 | Fin |
| 2010/0206177 A1 | 8/2010 | Ricotti |
| 2010/0218684 A1 | 9/2010 | Etter et al. |
| 2010/0282090 A1 | 11/2010 | Etter et al. |
| 2011/0041696 A1 | 2/2011 | Aemisegger et al. |
| 2011/0126717 A1 | 6/2011 | Gavillet et al. |

FOREIGN PATENT DOCUMENTS

| | | |
|---|---|---|
| CH | 593044 | 11/1977 |
| CH | 593630 | 2/1978 |
| CH | 682798 | 11/1993 |
| CN | 101073470 | 11/2007 |
| DE | 2019445 | 11/1971 |
| DE | 19647039 | 7/1997 |
| DE | 19737694 | 10/1998 |
| DE | 19732414 | 2/1999 |
| DE | 10322034 | 12/2004 |
| EP | 0152148 | 8/1985 |
| EP | 0387515 | 9/1990 |
| EP | 0468079 | 1/1992 |
| EP | 0485211 | 5/1992 |
| EP | 512142 | 11/1992 |
| EP | 512148 | 11/1992 |
| EP | 604615 | 7/1994 |
| EP | 0862882 | 9/1996 |
| EP | 0761150 | 3/1997 |
| EP | 0784955 | 7/1997 |
| EP | 1121882 | 8/2001 |
| EP | 1133010 | 9/2001 |
| EP | 1153561 | 11/2001 |
| EP | 1219217 | 7/2002 |
| EP | 1253844 | 11/2002 |
| EP | 1299022 | 4/2003 |
| EP | 1380243 | 1/2004 |
| EP | 1444932 | 8/2004 |
| EP | 1447675 | 8/2004 |
| EP | 1486150 | 12/2004 |
| EP | 1529469 | 5/2005 |
| EP | 1610596 | 12/2005 |
| EP | 1635680 | 3/2006 |
| EP | 1659547 | 5/2006 |
| EP | 1669011 | 6/2006 |
| EP | 1721553 | 11/2006 |
| EP | 1757212 | 2/2007 |
| EP | 1774878 | 4/2007 |
| EP | 1774884 | 4/2007 |
| EP | 1775234 | 4/2007 |
| EP | 1776026 | 4/2007 |
| EP | 1829469 | 9/2007 |
| EP | 1864598 | 12/2007 |
| EP | 1878368 | 1/2008 |
| EP | 1893064 | 3/2008 |
| EP | 2218370 | 8/2010 |
| EP | 1859714 | 1/2011 |
| EP | 2374383 | 10/2011 |
| FR | 1358502 | 4/1964 |
| FR | 2424010 | 11/1979 |
| FR | 2745995 | 9/1997 |
| FR | 2799630 | 4/2001 |
| FR | 2898734 | 9/2007 |
| GB | 847662 | 9/1960 |
| IT | 0001332000 | 1/2006 |
| TW | 322459 | 12/1997 |
| WO | 9847418 | 10/1998 |
| WO | 9951947 | 10/1999 |
| WO | 0045685 | 8/2000 |
| WO | 0154551 | 8/2001 |
| WO | 0160221 | 8/2001 |
| WO | 02074144 | 9/2002 |
| WO | 2004006742 | 1/2004 |
| WO | 2004069012 | 8/2004 |
| WO | 2005002405 | 1/2005 |
| WO | 2005058111 | 6/2005 |
| WO | 2005060801 | 7/2005 |
| WO | 2005072574 | 8/2005 |
| WO | 2005072586 | 8/2005 |
| WO | 2006003116 | 1/2006 |
| WO | 2006005736 | 1/2006 |
| WO | 2006023309 | 3/2006 |
| WO | 2006066626 | 6/2006 |
| WO | 2006104575 | 10/2006 |
| WO | 2007016977 | 2/2007 |
| WO | 2007039683 | 4/2007 |
| WO | 2007111884 | 10/2007 |
| WO | 2007122144 | 11/2007 |

(56) References Cited

FOREIGN PATENT DOCUMENTS

| WO | 2007135136 | 11/2007 |
|----|------------|---------|
| WO | 2008014830 | 2/2008  |
| WO | 2008037642 | 4/2008  |
| WO | 2008046740 | 4/2008  |
| WO | 2008154805 | 12/2008 |
| WO | 2009043851 | 4/2009  |
| WO | 2009043865 | 4/2009  |
| WO | 2009074550 | 6/2009  |
| WO | 2009130099 | 10/2009 |
| WO | 2010015427 | 2/2010  |

CAP EXTRACTION DEVICE

PRIORITY CLAIM

This application is a continuation application of U.S. patent application Ser. No. 12/607,670, filed on Dec. 8, 2009, which is a continuation application of U.S. patent application Ser. No. 10/563,611, filed on Jan. 6, 2006 which issued as U.S. Pat. No. 7,703,380 on Apr. 27, 2010, which is a National Stage of International Application No. PCT/EP2004/006672, filed Jun. 21, 2004, which claims priority to European Application No. 03015776.2, filed Jul. 10, 2003, the entire contents of which are being incorporated herein by reference.

BACKGROUND

The present invention relates to a capsule extraction device and the machine incorporating said device. Capsule extraction devices already exist on the market. There is a need to propose an extraction device that makes it easier to insert and position the capsule in the device but that is both simple and low cost.

One problem encountered is the positioning of the capsule in the device and the closing of the latter around the capsule to perform the extraction. The capsule usually has to be positioned by the user on a capsule support or in a housing, then the device is closed manually or automatically around the capsule. It is important to correctly position the capsule so that the device closes correctly around the latter and a good seal is thus achieved to ensure good conditions of extraction. Bad positioning may damage the capsule, and thus affect the conditions of extraction. The loading of the capsule must also be easy, without trial and error as to the correct position of the capsule in the device. The loading must also be as rapid as possible and not require excessive manipulations.

So devices exist that propose the insertion of the capsule in a vertical plane and the movement of the extraction or infusion parts along a horizontal plane around the capsule. Such systems have the advantages of allowing a loading from the top piggy-bank fashion, and makes for rapid loading. The positioning of the capsule is then taken over by the movement of a movable part that pushes the capsule against another part such as a water heater. However, these devices are complex to produce and are not suitable for low-cost and therefore entry-level coffee machines for the consumer market. They are therefore usually intended for the business market such as restaurants, bars or communities. For example, patent application WO 98/47418 relates to a device for the extraction of pre-measured inserts in which the inserts are inserted vertically and are extracted horizontally. The disadvantage of this device is that it comprises two movable parts for the extraction, which makes the mechanical principle more complicated.

U.S. Pat. No. 5,776,527 relates to a device for the infusion of lens-shaped filter capsules comprising means of guidance and retention in the form of movable stops that are pushed by a movable piston horizontally towards a water heater. The stops return to their position under the effect of a spring to release the capsule which then falls under the effect of gravity when the stops are rotated to open downward. Such a device uses several combined movements of the capsule guidance and retention means. This makes the device complex and expensive to produce.

Patent application EP 1 219 217 A1 relates to a coffee machine comprising a capsule seat that oscillates between a position for receiving the capsule and a position for releasing the capsule. The seat is pushed against the water injection system by means of a piston that moves horizontally when the seat is in the vertical position. Due to the oscillating configuration of the seat and the compliance with three reference positions of the latter, and the number of pieces necessary, such a device is complex and costly to produce.

SUMMARY

The object of the present invention is to provide the consumer with an extraction system that is of simpler design, less costly and mechanically reliable. One of the objects is to make it easier to insert a capsule into a device for the extraction of this capsule; in particular, to allow the insertion and positioning of a capsule in an extraction device without trial and error, and without excessive manipulations and without risk of incorrectly positioning the capsule in said device. Another object is to limit the number of pieces necessary, in particular, the number of movable pieces of the device in order to reduce its complexity and its production cost.

The present invention relates to a capsule extraction device comprising
   a first part,
   a second part that can be moved relative to the first part,
   a housing for the capsule and defining, in the closed position of the second movable part against the first part, an extraction position of the capsule along an axis in said housing,
   a capsule insertion and positioning part arranged so as to insert the capsule by gravity and position said capsule in an intermediate position,
   a drink pouring system,
   in that the second movable part is configured to move the capsule from the intermediate position into the extraction position when the device is closed.

The capsules that can be extracted with the device according to the invention are of any type, for example open capsules, of the filter paper capsule type or also rigid or semi-rigid capsules of cylindrical shape or frustoconical shape that are the subject of patents in the name of the Applicant, that is EP 512'148 and EP 602'203. In a preferred embodiment, the capsule is asymmetric and comprises a guidance edge which is handled by the guidance means of the device. Thus, an asymmetric capsule along a guidance edge makes it possible to make the capsule tilt slightly relative to the extraction axis. Such a tilt has the advantage of being able to act on the capsule when it is reestablished in the axis of extraction as will be explained hereinafter. However, the device according to the invention may also operate with symmetric capsules.

The capsules may contain any type of soluble or extractable food product, for example roasted or ground coffee, soluble coffee, soluble cocoa, milk, tea, dehydrated substances for soups and other products and any combinations of these products.

For reasons of simplicity, the device of the invention preferably comprises a first part that is fixed and a second part that is movable relative to the first part. However, there is nothing against providing a first part and a second part that are both movable.

In fact, the device according to the invention makes it possible to cause the capsule to travel from an intermediate position to an extraction position: it is held in its intermediate position, it travels into its extraction position and when the second movable part is opened after extraction, the capsule is released naturally under the simple effect of gravitation. It falls into a drawer or any other means of used capsule retrieval and the consumer is ready to reload the device.

Preferably, the device comprises means of stopping the capsule. These stopping means are configured to keep the capsule in the intermediate position when the capsule is inserted into the insertion and positioning part. These stopping means keep the capsule in an axis offset or inclined relative to the axis of the capsule in the extraction position in the housing. The extraction position corresponds to the position in which the movable part is closed against the fixed part while enclosing the capsule.

It may be noted that the housing may be made in the movable part or the fixed part or else be divided between both in the fixed part and the movable part.

So, to travel from the intermediate position to the extraction position, there are at least two solutions.

A first solution consists of keeping the capsule in the intermediate position in a manner offset relative to the axis of the capsule in the extraction position, for example, so that the movable part in its movement acts on the capsule to lower it and push it along the axis of said movable part in its extraction position. The capsule may be offset along its recentering axis (or extraction axis), for example parallel to the latter, or be inclined relative to its recentering axis at a certain angle, preferably a small angle, less than 30 degrees. Such a solution makes it possible to prevent any mechanical complexity and uses a minimum of moving pieces. Specifically, the capsule may be simply kept in the intermediate position by static stopping means and it is the movable part that handles the moving of the capsule when it is moved toward the fixed part and then comes to position it in the extraction position.

In a first preferred embodiment, the movable part is thus configured to force the capsule to travel beyond the stopping means when the capsule travels from its intermediate position to its extraction position. Thus, when the movable part drives the capsule, the latter being positioned in an offset or inclined axis, the capsule is forcibly re-established in the axis of movement of the movable part corresponding to the axis of the capsule in the extraction position, which forces the capsule to travel beyond the stopping means. Once the stopping means have been passed by the capsule, the latter is placed in the extraction position by at least one of the parts closing against the other and pressing the capsule against the extraction part. Once the two parts have reopened, the capsule is no longer held by the stopping means and can therefore be released. It can be understood that such a configuration provides more simplicity and reliability than the known systems.

A second possibility is that the movable part simply pushes the capsule in its axis of travel into its extraction position.

Thus, the device comprises stopping means configured to hold the capsule in the intermediate position along an axis substantially coaxial with the axis of the housing. In a preferred embodiment, the movable part acts on the opening of the stopping means in order to move them aside when the capsule travels from its intermediate position to its extraction position.

The fixed part comprises a guide body for the movement in translation of the movable part toward the fixed part. The guide body may, for example, be oriented substantially horizontally to guide the movable part in a horizontal movement. This guide body consists, for example, of at least two rails, preferably four guide rails. The device according to the invention allows an extraction by horizontal water injection. The movable part is preferably substantially cylindrical.

In the device according to the invention, the insertion and positioning part of the capsule is placed in front of and perpendicular to the guide body and comprises at least one guidance means. Preferably, it comprises two guidance means. These means may be of any kind; for example, in the case of the extraction of a capsule according to patent EP 512'148, they are insertion slides allowing the engagement of the capsule collar.

To keep the capsule in the intermediate position, in a first embodiment, the guidance means comprise at least one stopping means placed at the same level in order to keep the capsule in said intermediate position. Preferably, the guidance means comprise two stopping means. These means may be of any kind, for example stopping bosses, of just sufficient height to immobilize the capsule. The bosses interact with an edge of the capsule, such as a collar, for example. The bosses thus hold the capsule by the collar bearing on the bosses. The passage from the bearing position to the release position may be achieved by forcing the collar to travel beyond the bosses, the latter being able to be fixed or elastically retractable.

In another embodiment of the device according to the invention, the guidance means are pivoting and form or comprise stopping means arranged to immobilize the capsule in the intermediate position when the movable part is in the open position and to release the capsule when the movable part is in the closed position. These guidance means are actuated in the immobilization or release position by an actuating lever, mounted rotatably and placed on the outside of the movable part: this lever, by the movement of the movable part, places the guidance means in the immobilization or release position.

In a final embodiment of the device according to the invention, the latter comprises, in front of the guide body, a retractable stop, placed beneath the movable part. This retractable stop is also actuated by the movement of the movable part: it makes it possible to keep the capsule in position when the movable part is in the open position.

The device also comprises an extraction plate toward which the movable part moves the capsule in the extraction position. The capsule usually comprises an extraction face which is placed in contact with, or at least is brought sufficiently close to, the extraction plate when the device is closed. If a filter paper capsule is extracted, this plate is a simple plate pierced with holes to allow the extraction liquid to pass through. If the capsule is a capsule according to the two patents mentioned hereinabove, such as for example a capsule having a face intended to tear as the pressure rises in the capsule, it is a plate comprising either pyramids or spikes as mentioned in the patents EP 512'142 and EP 604'615.

The movable part is moved by the means providing the movement into the open and closed position. These means may take various forms. Use is preferably made of means that are mechanically simple, such as systems with transmission by rods combined with an immobilization system of the ball-and-socket joint type. Any other solution giving a substantially linear movement is also possible, for example hydraulic, electric or mechanical systems, for example with screws.

As already mentioned hereinabove, at the end of extraction, the opening of the movable part allows the capsule to fall by gravitation.

The operation of the device in the first embodiment is as follows: the consumer inserts a capsule via the insertion slide. The capsule is guided, for example, by a peripheral edge forming a collar which is inserted into said slide. The stopping means immobilize the capsule in the intermediate position; in particular, its peripheral edge is held by the stopping means. The consumer acts on the means allowing the closure of the movable part, so that the movable part takes the capsule into its housing and lowers the axis of the capsule to bring it into the axis of movement of the movable body, which has the effect that the collar of the capsule passes over the stopping means and is positioned in the extraction position beneath these stopping means. The extraction takes place and when the movable part is opened, the capsule falls by gravitation because it is no longer held by the stopping means.

FIGS. 7 to 13 below show the operation in the other embodiments.

The device according to the invention is incorporated into a coffee machine or other extraction system comprising furthermore a water tank, a water pipe, a pump for moving the water, means of heating the water and a water outlet in the movable part and any other element normally present in a coffee machine or other extraction system. "Other extraction system" means multi-drink, espresso and other extraction systems.

The invention also relates to a coffee machine comprising the device thus described. The machine furthermore comprises a water tank, a water pipe, a pump for moving the water, means of heating the water and a water outlet in the movable part of the device of the invention.

The rest of the description is made with respect to the drawings.

DETAILED DESCRIPTION

Figure 1:
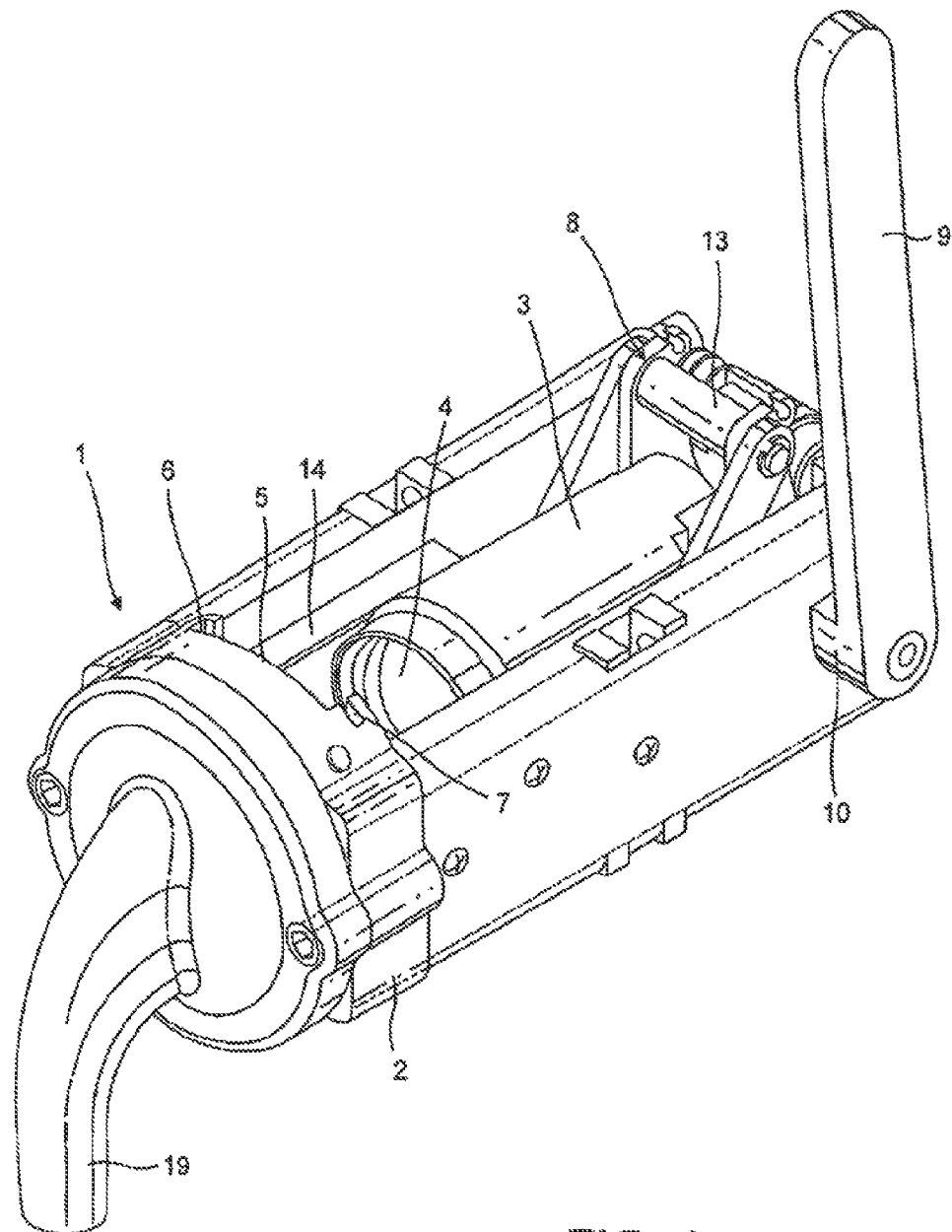
FIG. 1 is a view in perspective of a device according to the invention in the open position.
Figure 2:
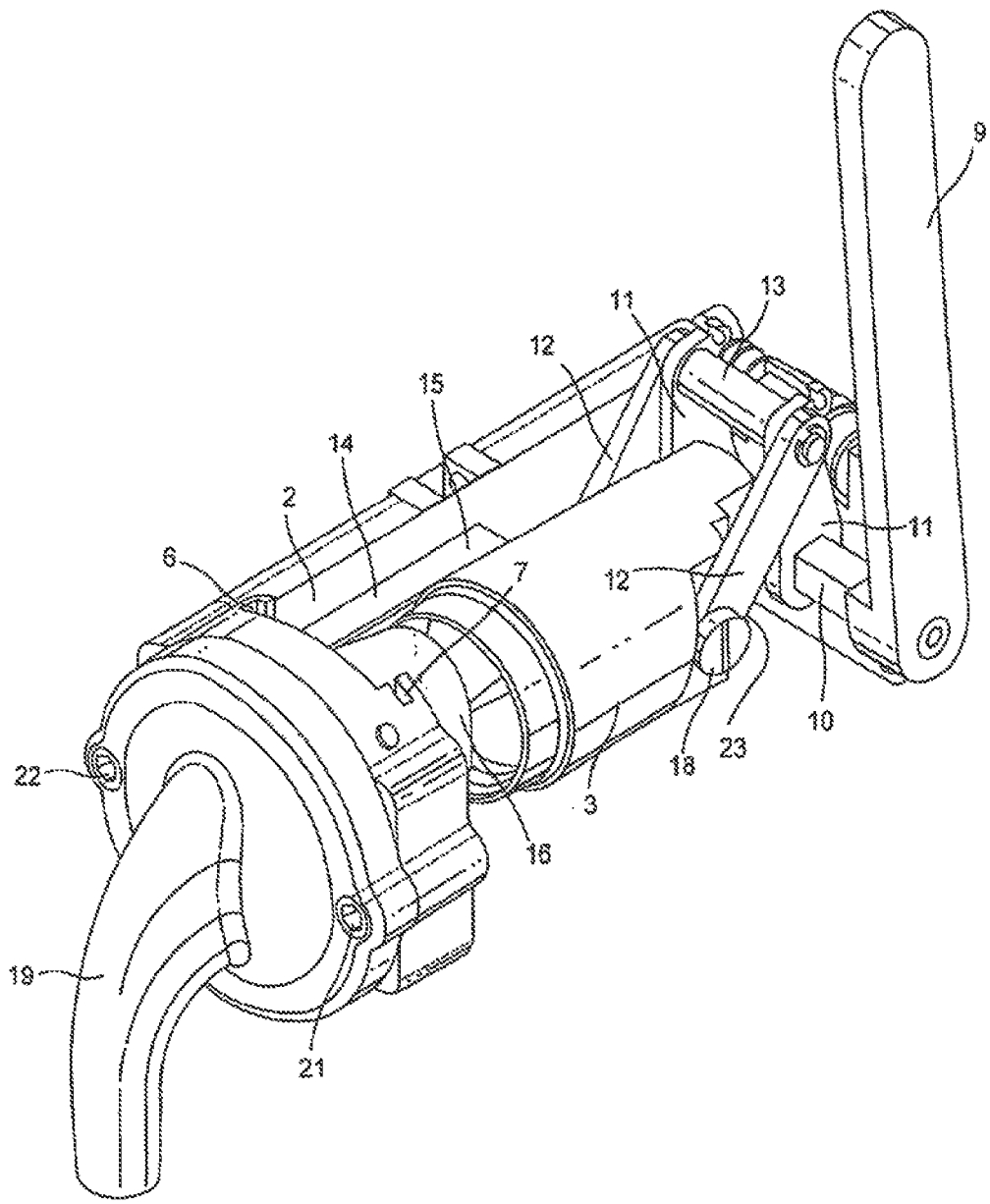
FIG. 2 is the same view as that in FIG. 1, without the guide body so that it is easier to understand the movement of the movable part.
Figure 3:
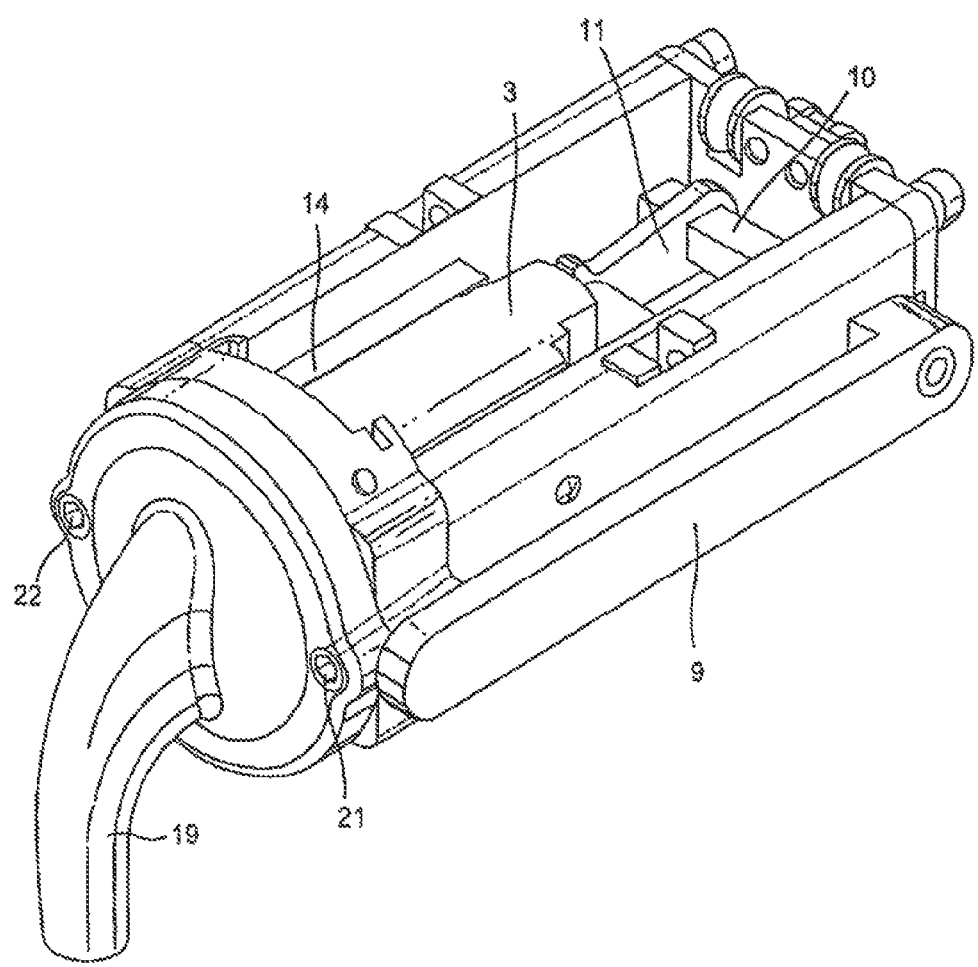
FIG. 3 is a view in perspective of the device according to the invention in the closed position.
Figure 4:
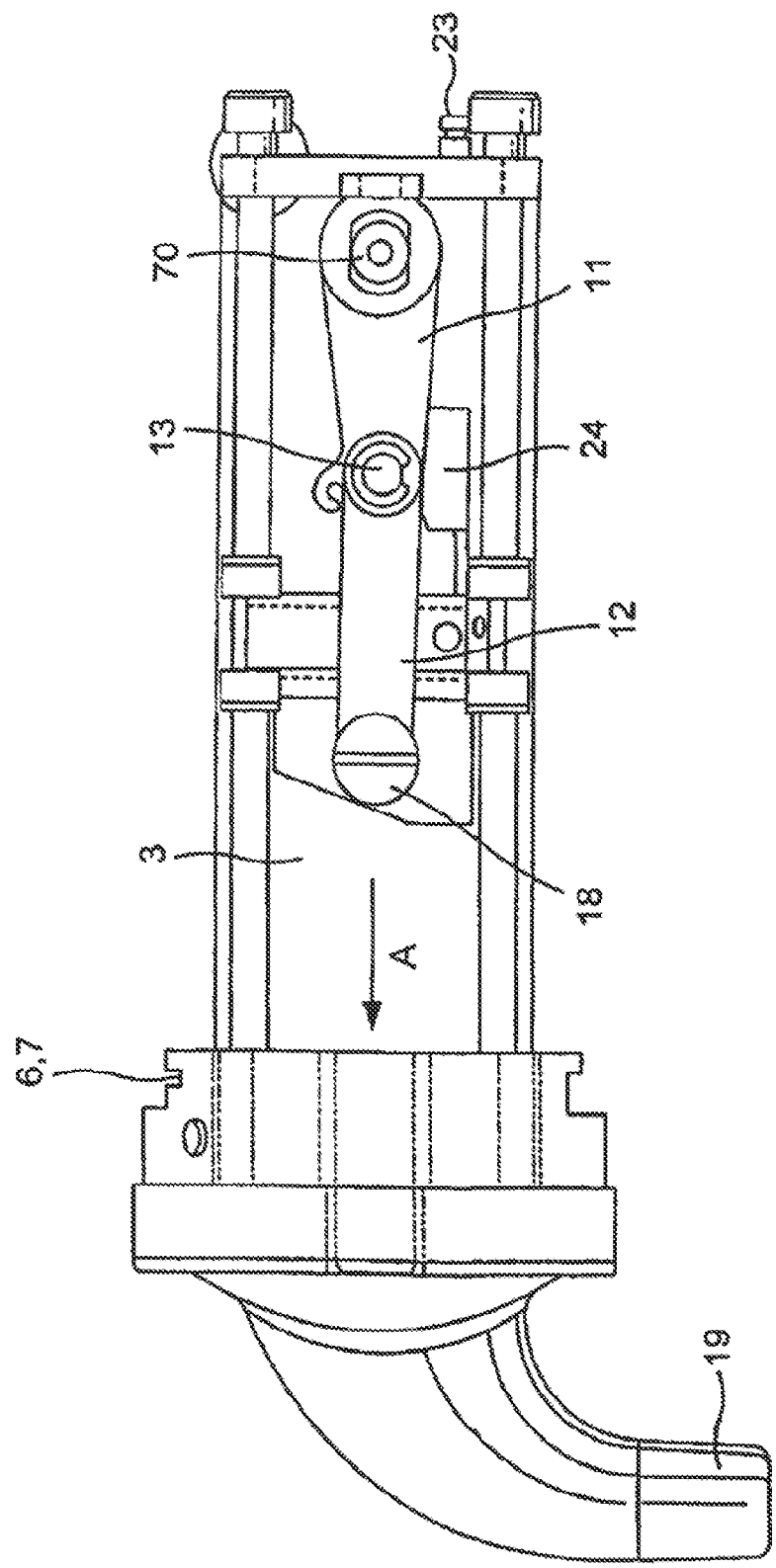
FIG. 4 is a side view in the closed position.
Figure 5:
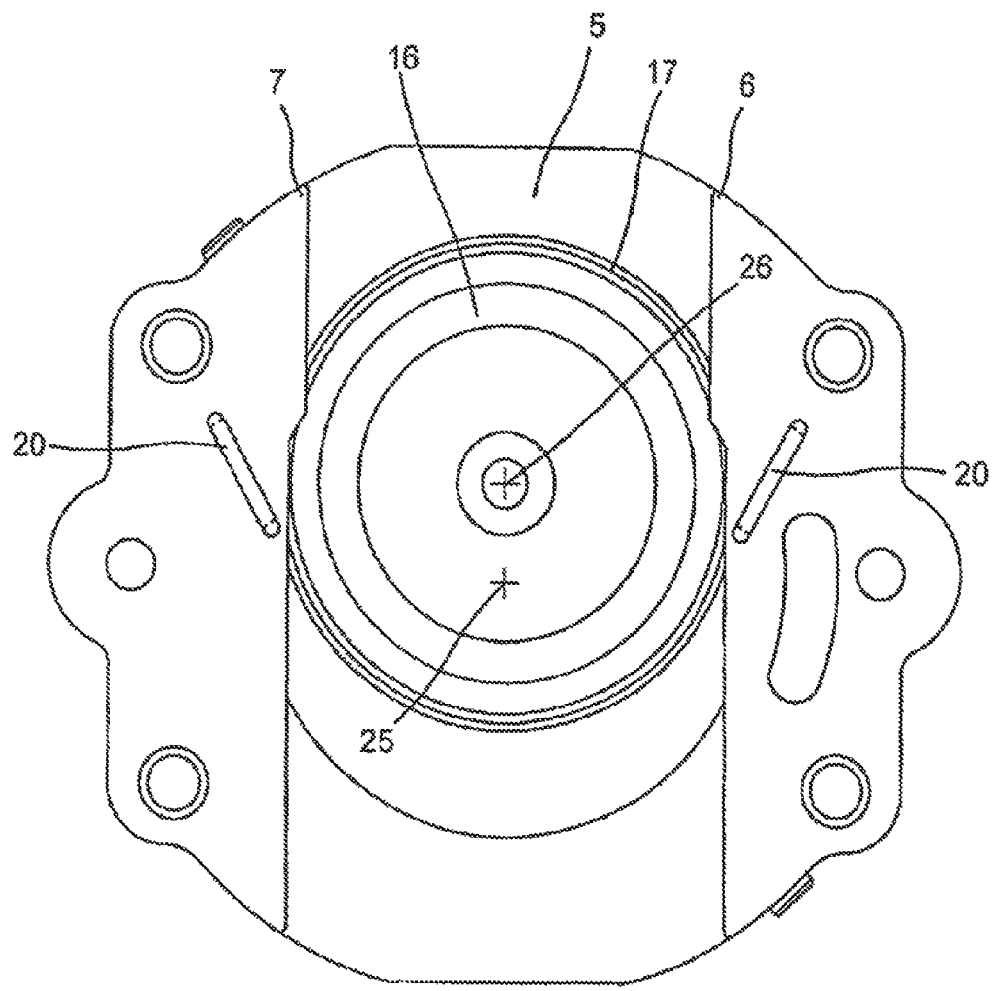
FIG. 5 is a view in the axis A of positioning the capsule in the intermediate position.
Figure 6:
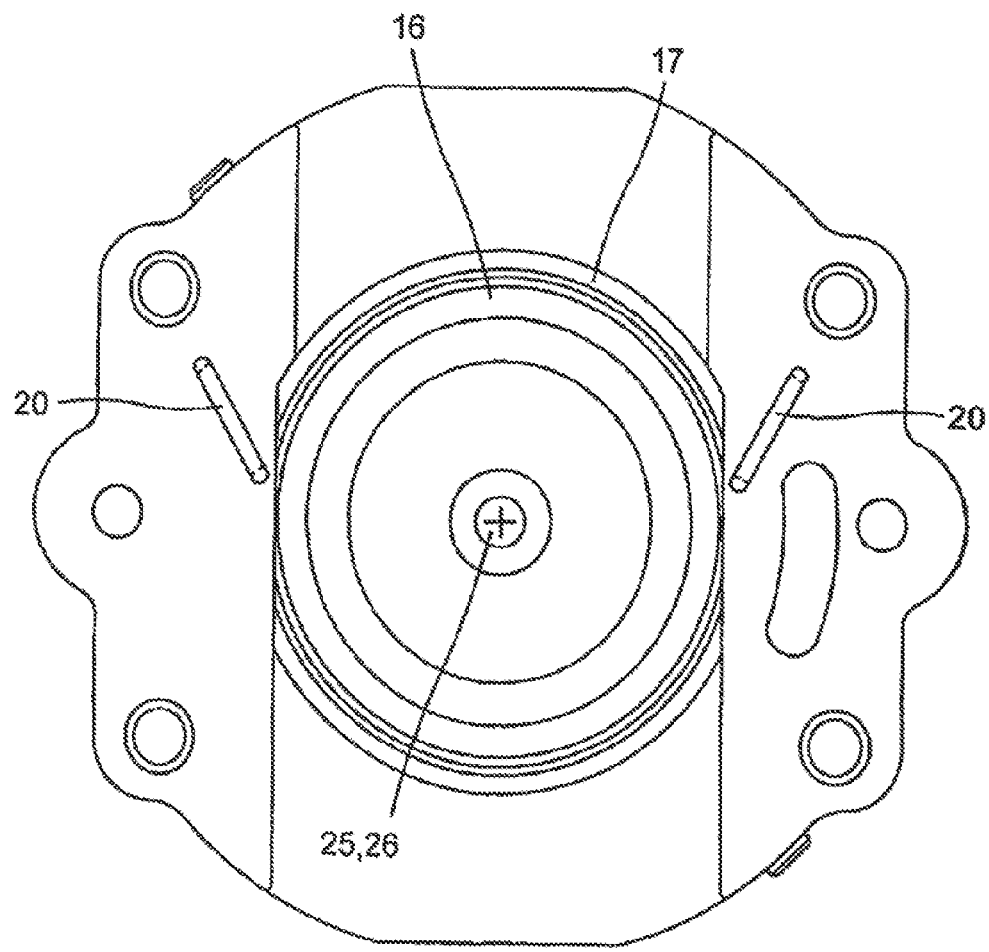
FIG. 6 is the same view as in FIG. 5 with the capsule in the extraction position.
Figure 7:
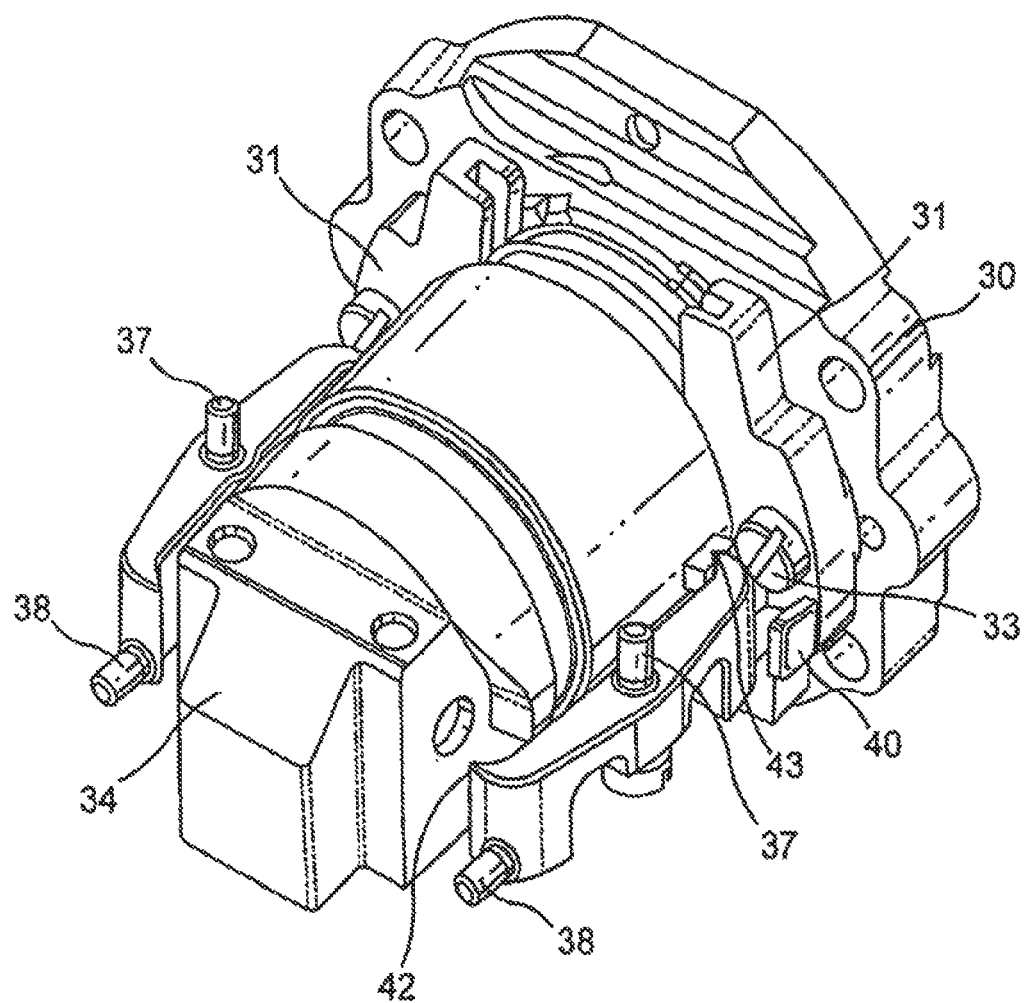
FIG. 7 is a view in perspective according to a second embodiment, with the movable part in the closed position.

With reference to FIGS. 1 to 6, the extraction device 1 comprises a fixed part 2 and a movable part 3. The part 3 comprises a housing 4 for the capsule to be extracted. The insertion and positioning part of the capsule 16 comprises two guidance means 6, 7, in which the capsule slides for positioning it. The capsule may thus be furnished with a collar which slides across the guidance means. The capsule is held in a position offset relative to the axis 25 of movement of the movable part. Since the capsule is asymmetric relative to its collar, the capsule also inclines slightly because its center of gravity is offset relative to the collar. This offset assists with the capsule being received by the housing of the movable part when it moves. The movable part 3 is moved by means 8 closing and opening it. These means consist of a ball-and-socket joint system comprising a lever arm 9 fixedly attached to an operating shaft 10. This shaft is fixedly attached to two pairs of rods respectively 11 and 12. The rods 11 and 12 are joined together along a spindle of the rods 13. The rods 12 are fixedly attached by a system of screws 18 to the movable body 3. The movable body 3 moved by the ball-and-socket joint system slides in a guide body 14 consisting of four rails 15. When the ball-and-socket joint system closes, the spindle 13 of the rods is stopped in its movement by the stop 24. The capsule 16 is designed to go and press against an extraction plate 17 when said capsule is extracted. The drink flows through the pouring system 19 into a cup not shown. The device according to the invention finally comprises, in the guidance means 6, 7, two identical stopping means 20 allowing the capsule to be held in the intermediate position. The screws 21, 22 make it possible to fixedly attach the pouring system to the extraction plate. A water outlet 23 is provided on the rear of the movable body.

The device according to the invention operates as follows: the consumer inserts the capsule 16 through the insertion slides 6, 7. The capsule slides until it reaches the stopping means 20: the collar of the capsule presses against these means and the capsule is in the intermediate position, as is also clearly seen in FIG. 5: the axis of the capsule is indicated by reference number 26 and the axis of the movable body by reference number 25. Since the capsule is asymmetric relative to the plane passing through its collar, the axis of the capsule tends to incline slightly relative to the axis of movement of the movable part. The consumer then operates the lever 9, which moves the movable body 3 via the rod system. This movable body moves along its axis 25: during this movement, it causes the capsule 16 to enter into its housing 4, which has the effect of lowering the axis 26 of the capsule toward the axis 25 of the movable body. The consequence is that the collar of the capsule passes beneath the stopping means 20. The consumer then gives the instruction to feed the hot water through the pipe 23 in the movable body: the water traverses the capsule; through the rise in pressure, the capsule opens against the extraction plate and the coffee flows through the outlet 19 into a cup placed beneath. When the extraction is complete, the consumer raises the lever 9, which sets the movable body in motion rearward, releases the capsule which is no longer held and which thus falls into a used capsule recovery system. The device is then ready for the next extraction.

With reference to FIGS. 7 to 10, the device according to the invention is more represented relative to the means of guiding and immobilizing the capsule, than relative to the movable part and the means of moving said movable part. The extraction plate 30 comprises, as a means of guiding 31 the capsule 32, two elements pivoting about a spindle 33. Each pivoting element comprises two positioning stops, one internal 39, the other external 40, better shown in FIGS. 9 and 10. The movable part 34 comprises a housing 35 for the capsule and on either side a boss 41. The means for moving the movable part are not shown. On both sides of the movable part, an actuating lever 36 has been placed, turning along the axis 37 and comprising a movement finger 38 of the guidance means 31 and two zones of action, front 42 and rear 43, of said actuating lever 36.

The stopping means 20 are configured to hold the capsule in the intermediate position along an axis substantially coaxial with the axis of the housing 4. In a preferred embodiment, the movable part 3 acts on the opening 44 of the stopping means 20 in order to move them aside when the capsule travels from its intermediate position to its extraction position.

Figure 8:
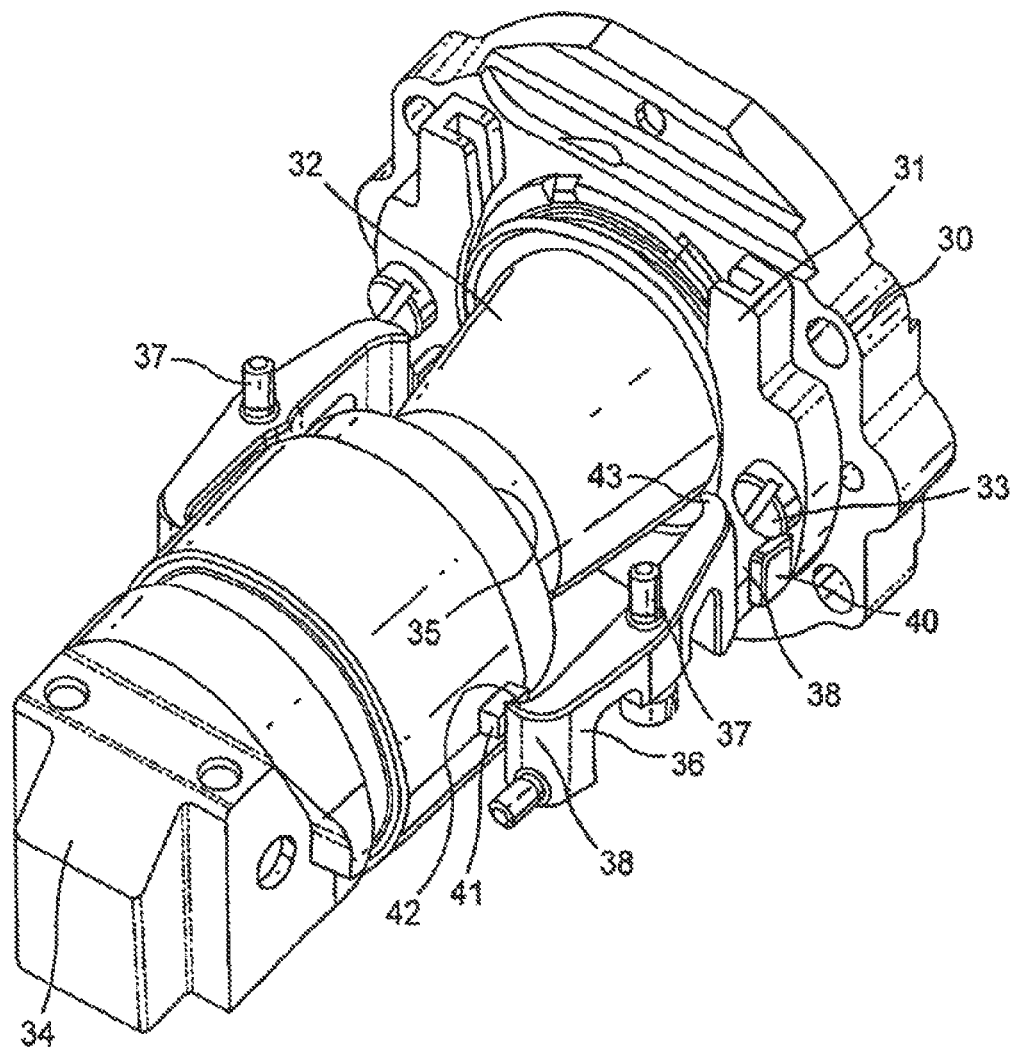
FIG. 8 is a view in perspective according to the preceding figure, with the movable part in the open position.
Figure 9:
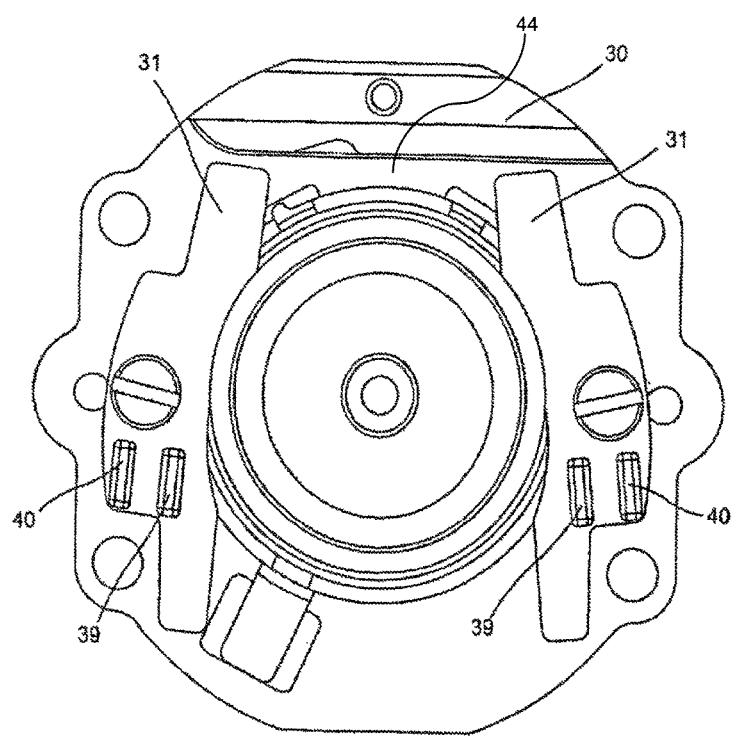
FIGS. 9 and 10 are views in the axis of the extraction plate.
Figure 10:
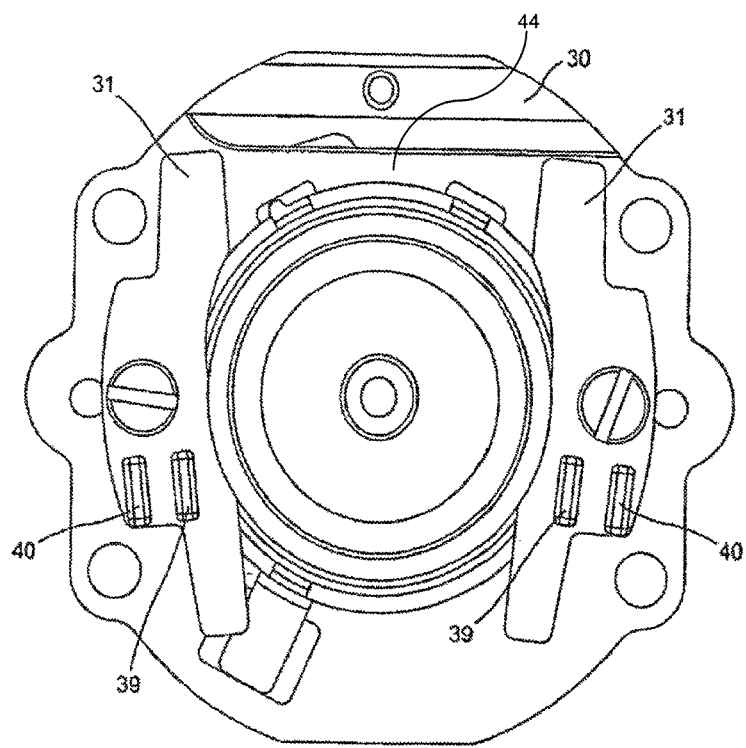

The operation is as follows:

In the open position, that is according to FIG. 8, the movement finger 38 of the actuating lever 36 holds the pivoting guidance means 31 in the position of retention of the capsule 32 (FIG. 10), because said finger acts on the internal stop 39 of the pivoting element 31. When the movable part 34 moves toward the extraction plate 30, the boss 41 releases the front action zone 42 and goes to position itself toward the rear action zone 43, so that the movement finger 38 pushes the external positioning stop 40 outward. The consequence of this is that the pivoting guidance means moves away, which means that, when the movable part is opened, the capsule will no longer have any retention.

Figure 11:
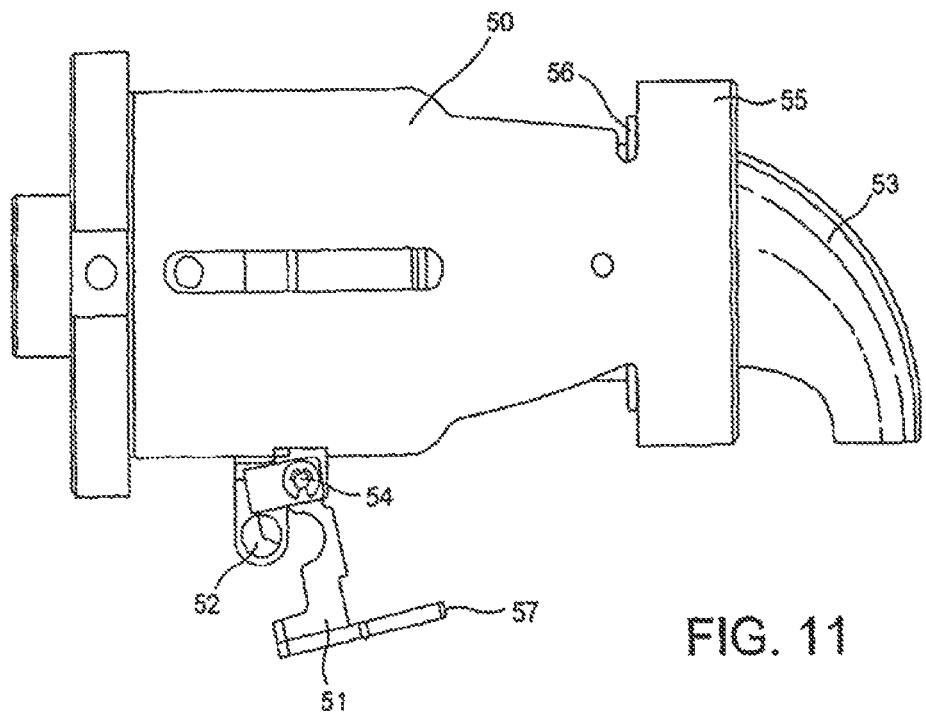
FIGS. 11 to 13 are schematic views of the device according to the invention in a final embodiment.
Figure 12:
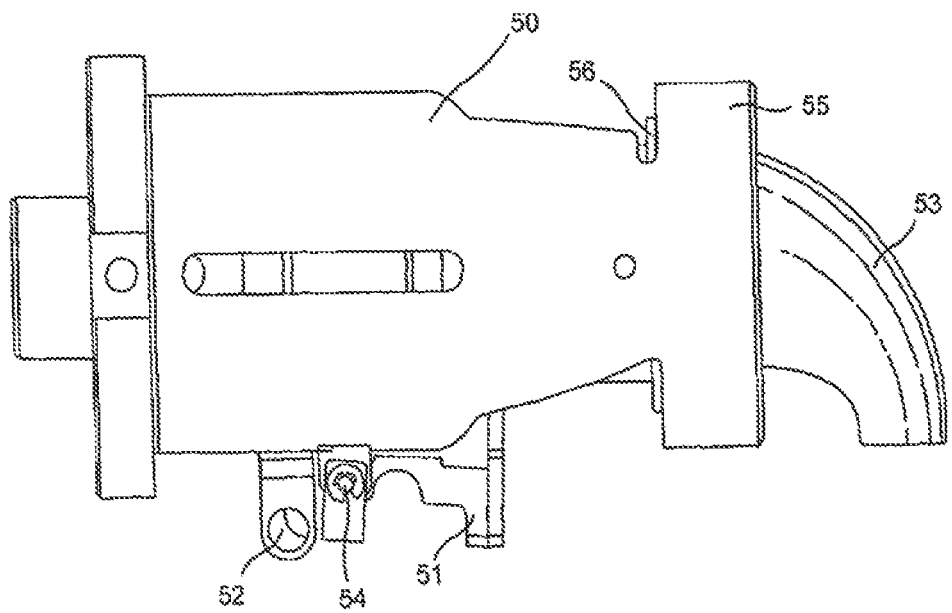
Figure 13:
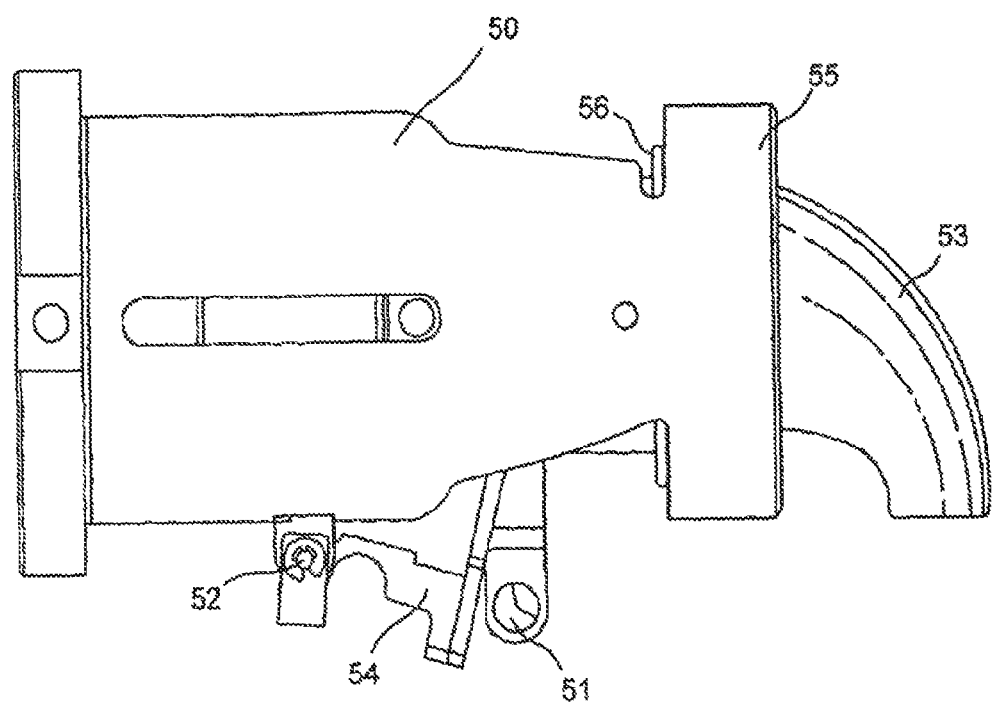

FIGS. 11 to 13 give another embodiment of the immobilizating of the capsule. The fixed part 50 comprises an extraction plate 55 and a drink pouring system 53. Beneath the intermediate positioning location of the capsule 56, there is a retractable stop 51, that rotates on the spindle 54. The finger 57 makes it possible to retain the capsule. Finally the device comprises an element 52, fixedly attached to the movable part and thus acting on the retractable stop to open it and close it.

The operation is as follows:

FIG. 11 shows when the movable part is in movement to open. So that the element 52 causes the retractable stop to tilt downward, which releases the capsule. FIG. 12 shows the end of the opening stroke of the movable part, when the retractable stop has returned to the position for immobilizing the capsule 56. Finally, FIG. 13 shows the position of the retractable stop at the time of extraction of said capsule 56.

It is well understood that the device according to the invention forms part of a coffee machine comprising all the elements making it possible to extract the capsules, that is to say a water tank, a water inlet pipe, a pump for moving the water, means of heating the water and a water inlet in the movable part.

The invention is claimed as follows:

1. A device for extraction of a capsule, the device comprising:
    a first part;
    a second part which is mobile relative to the first part;
    a receptacle for the capsule, which, in a first position of closure of the second, mobile part against the first part, defines a position of extraction of the capsule according to an axis in the receptacle;
    a part for introduction and positioning, comprising guide means for guiding the capsule, which are arranged to insert the capsule by gravity, and to position the capsule in an intermediate position; and
    a system for flow of a drink, the second, mobile part being configured to displace the capsule from the intermediate position to the position of extraction during closure of the device,
    the system for flow of a drink comprises stop means, the stop means comprise a first stop member and a second stop member, the guide means comprise a first guide member on which the first stop member is positioned and a second guide member on which the second stop member is positioned, and the first and second guide members are opposed elements pivotable independently, the second, mobile part acting on an opening of the stop means to move the stop means apart from each other during passage of the capsule from the intermediate position to the position of extraction.

2. The device according to claim 1, wherein the stop means are configured to retain the capsule in the intermediate position according to an axis which is substantially coaxial to the axis of the receptacle.

3. The device according to claim 1, wherein the first part is fixed and comprises a substantially horizontal guide body that guides the second, mobile part in translation towards the first, fixed part.

4. The device according to claim 3, wherein the part for introduction and positioning of the capsule is arranged in front of the guide body and comprises the first and second guide members.

5. The device according to claim 4, wherein the stop means are arranged to block the capsule in the intermediate position when the second, mobile part is in an opening position, permitting insertion of a capsule, and to release the capsule when the second, mobile part is in the closure position, to allow the capsule to be displaced from the intermediate position to the position of extraction, and to allow the capsule to be released when the second, mobile part is reopened.

6. The device according to claim 1, comprising an extraction plate towards which the second, mobile part displaces the capsule in the position of extraction.

7. The device according to claim 1, wherein the second, mobile part is moved by means which assure displacement into the opening and closure positions.

8. The device according to claim 7, wherein the means which assure the displacement are a system of connecting rods.

9. The device according to claim 1, wherein reopening of the second, mobile part permits dropping of the capsule by gravity.

10. The device according to claim 9, wherein the capsule is guided in its fall by the guide means.

11. A coffee machine comprising:
    a device for extraction of a capsule, the device comprising:
    a first part;
    a second part which is mobile relative to the first part;
    a receptacle for the capsule, which, in a first position of closure of the second, mobile part against the first part, defines a position of extraction of the capsule according to an axis in the receptacle;
    a part for introduction and positioning, comprising guide means for guiding the capsule, which are arranged such as to insert the capsule by gravity, and to position the capsule in an intermediate position; and
    a system for flow of a drink, the second, mobile part being configured to displace the capsule from the intermediate position to the position of extraction during closure of the device, the system for flow of a drink comprises stop means, the stop means comprise a first stop member and a second stop member, the guide means comprise a first guide member on which the first stop member is positioned and a second guide member on which the second stop member is positioned, and the first and second guide members are opposed elements pivotable independently, the second, mobile part acting on an opening of the stop means in order to move the stop means apart from each other during passage of the capsule from the intermediate position to the position of extraction;
    a water reservoir;
    a water duct;
    a pump for displacement of the water;
    means for heating the water; and
    a water intake in the second, mobile part of the device.

12. A system comprising:
    a device for extraction of a capsule, the device comprising:
    a first part;
    a second part which is mobile relative to the first part;
    a receptacle for the capsule, which, in a first position of closure of the second, mobile part against the first part, defines a position of extraction of the capsule according to an axis in the receptacle;
    a part for introduction and positioning, comprising guide means for guiding the capsule, which are arranged such as to insert the capsule by gravity, and to position the capsule in an intermediate position; and
    a system for flow of a drink, the second, mobile part being configured to displace the capsule from the intermediate position to the position of extraction during closure of the device, the system for flow of a drink comprises stop means, the stop means comprise a first stop member and a second stop member, the guide means comprise a first guide member on which the first stop member is positioned and a second guide member on which the second stop member is positioned, and the first and second guide members are opposed elements pivotable independently, the second, mobile part acting on an opening of the stop means in order to move the stop means apart from each other during passage of the capsule from the intermediate position to the position of extraction; and an asymmetrical capsule comprising a guide edge which is controlled by guide means of the device.

13. The system according to claim 12, wherein the capsule contains roasted ground coffee.

14. A device for extraction of a capsule, the device comprising:

a first part;

a second part which is mobile relative to the first part;

a receptacle for the capsule, which, in a first position of closure of the second, mobile part against the first part, defines a position of extraction of the capsule according to an axis in the receptacle;

a part for introduction and positioning, comprising a plurality of guide members for guiding the capsule, which are arranged to insert the capsule by gravity, and to position the capsule in an intermediate position; and a system for flow of a drink, the second, mobile part being configured to displace the capsule from the intermediate position to the position of extraction during closure of the device, the system for flow of a drink comprises stop members, the stop members comprise a first stop member and a second stop member, the plurality of guide members comprise a first guide member on which the first stop member is positioned and a second guide member on which the second stop member is positioned, and the first and second guide members are opposed elements pivotable independently, the second, mobile part acting on an opening of the stop members to move the stop members apart from each other during passage of the capsule from the intermediate position to the position of extraction.

* * * * *